United States Patent
Pafchek

(10) Patent No.: US 11,502,474 B2
(45) Date of Patent: Nov. 15, 2022

(54) HIGH EFFICIENCY 1.3μM EMISSION IN PRASEODYMIUM DOPED CONVENTIONAL GLASS AND FIBER

(71) Applicant: Thorlabs, Inc., Newton, NJ (US)

(72) Inventor: Robert M. Pafchek, Blandon, PA (US)

(73) Assignee: Thorlabs, Inc., Newton, NJ (US)

( * ) Notice: Subject to any disclaimer, the term of this patent is extended or adjusted under 35 U.S.C. 154(b) by 337 days.

(21) Appl. No.: 16/795,032

(22) Filed: Feb. 19, 2020

(65) Prior Publication Data

US 2020/0266600 A1 Aug. 20, 2020

Related U.S. Application Data

(60) Provisional application No. 62/807,521, filed on Feb. 19, 2019.

(51) Int. Cl.
*H01S 3/067* (2006.01)
*H01S 3/16* (2006.01)

(52) U.S. Cl.
CPC ...... *H01S 3/06716* (2013.01); *H01S 3/06754* (2013.01); *H01S 3/1613* (2013.01); *H01S 3/1618* (2013.01)

(58) Field of Classification Search
CPC .... H01S 3/1613; H01S 3/1618; H01S 3/1698; H01S 3/06716; H01S 3/06754; H01S 3/169
See application file for complete search history.

(56) References Cited

U.S. PATENT DOCUMENTS

| | | | |
|---|---|---|---|
| 5,694,500 A | 12/1997 | Page et al. | |
| 2002/0064366 A1 | 5/2002 | Cole et al. | |
| 2003/0087742 A1* | 5/2003 | Taylor | C03B 37/016 501/12 |
| 2004/0252738 A1 | 12/2004 | Hill | |
| 2005/0152824 A1* | 7/2005 | Kear | H01S 3/169 423/263 |
| 2006/0039433 A1* | 2/2006 | Simpson | H01S 3/0635 372/50.1 |
| 2006/0222592 A1* | 10/2006 | Burda | H01L 31/032 977/890 |
| 2011/0158595 A1* | 6/2011 | Burov | H01S 3/06716 977/773 |
| 2018/0109063 A1* | 4/2018 | Baker | H01S 3/169 |

FOREIGN PATENT DOCUMENTS

| | | |
|---|---|---|
| CA | 2157514 A1 | 9/1994 |
| CN | 1119052 A | 3/1996 |
| CN | 101933200 A | 12/2010 |
| EP | 1304774 A1 | 4/2003 |
| WO | 9715852 A1 | 5/1997 |
| WO | 0131367 A2 | 5/2001 |
| WO | 9715852 A1 | 4/2002 |

OTHER PUBLICATIONS

Pi et al., "Formation and oxidation of Si nanoclusters in Er-doped Si-rich SiOx", Journal of Applied Physics, pp. 096108-1 to 096108-3, Apr. 27, 2005, vol. 97, American Institute of Physics.
Baker et al., "Nanoparticle Doping for Improved Er-doped Fiber Lasers", Fiber Lasers XIII: Technology, Systems, and Applications, pp. 97280T-1 to 97280T-8, 2015, vol. 9728, SPIE.
Moraes et al., "Up conversion fluorescence spectroscopy in Pr 3 + doped optical fibers", Optics Communications, Elsevier, Amsterdam, NL, Aug. 1, 1991, pp. 279-282, vol. 84, No. 5-6.
Sang-Hoon et al., "Fabrication of Er3+/Pr3+ Co-doped soda-lime glass thin films using RF magnetron sputtering method and optical property characterization", Journal of Electroceramics, Kluwer Academic Publishers, BO, vol. 17, No. 2-4, Dec. 1, 2006.
Yuan-Bocaccini et al., "Pr 3 + doped network of halides in silica: A new approach to 1.3 @mm light amplifying material", Journal of Non-Crystalline Solids, North-Holland Physics Publishing, Amsterdam, NL, vol. 215, No. 1, Jul. 1, 1997, pp. 108-110.
Amlouk et al., "Luminescence of TiO" 2:Pr nanoparticles incorporated in silica aerogel, Material Science and Engineering:: B, Elsevier, Amsterdam, NL, vol. 146, No. 1-3, Dec. 21, 2007, pp. 74-79.
Biswas et al., "Preparation and characterisation of monolithic Pr-doped silica glasses by a sol-gel method", Materials Science and Engineering B, Elsevier, Amsterdam, NL, vol. 49, No. 3, Oct. 24, 1997, pp. 191-196.
Biswas et al., "Sol-gel synthesis of Pr-doped silica glasses", Materials Science and Engineering B, Elsevier, Amsterdam, NL, vol. 41, No. 3, Dec. 1, 1996, pp. 329-332.
Yamaguchi et al., "Deep-ultraviolet transparent monolithic sol-gel derived silica—REPO 4 (RE=Y, La-Lu except Pm) glass-ceramics: characterization of crystal structure and ultraviolet absorption edge, and application to narrow-band UVB phosphors Please do not adjust margins Please do not adjust margins Deep-ultraviol", J. Name, Jan. 1, 2013, pp. 1-3.
European Search Report, dated Jul. 13, 2020, 4 pages.
First Notification of Office Action issued by The China National Intellectual Property Administration for Chinese Patent Application No. 202010101344.7, dated Jan. 26, 2022.

* cited by examiner

*Primary Examiner* — Eric L Bolda
(74) *Attorney, Agent, or Firm* — Myers Wolin, LLC

(57) ABSTRACT

An optical material including: a silica host; and a Praseodymium dopant; wherein the Praseodymium atoms are configured to form nanoclusters in the silica host. In addition, the optical material may include an Ytterbium co-dopant. The nanoclusters include Ge, Te, Ta, Lu and/or F, Cl to minimize multi-phonon quenching. Moreover, the nanoclusters may be encapsulated in a low phonon energy shell to minimize energy transfer to the host matrix.

14 Claims, No Drawings

HIGH EFFICIENCY 1.3µM EMISSION IN PRASEODYMIUM DOPED CONVENTIONAL GLASS AND FIBER

CROSS REFERENCES TO RELATED APPLICATIONS

This application claims the benefit of U.S. Provisional Patent Application No. 62/807,521 filed on Feb. 19, 2019. The disclosure and entire teachings of U.S. Provisional Patent Application 62/807,521 are hereby incorporated by reference.

FIELD OF THE INVENTION

This invention relates generally to optical materials, and more particularly to a Praseodymium doped fiber.

BACKGROUND

The 1.3 µm transition in Praseodymium (Pr) suffers from multi-phonon quenching due to interactions with the matrix which essentially completely eliminates the radiative emission in silica based hosts. This can be minimized by choosing a low phonon energy host such as fluoride glass. Although the optical loss for fluoride fiber is lower than silica in the mid-Infrared (mid-IR) the loss at 1.3 µm is much lower in silica fiber which is advantageous for fiber lasers and amplifiers. Concentration quenching has also been shown to limit the dopant concentrations in mid-IR hosts such as fluoride glass.

SUMMARY

To overcome the above discussed shortcomings, the present application proposes that the high efficiencies demonstrated in silica doped with Erbium (Er) nanoclusters can be extended to Pr which may allow higher dopant concentrations and improved performance.

Additionally, it may be possible to tailor the nanocluster formation to shift the excited state absorption (ESA) which occurs in the 1.3 µm window to longer wavelengths. This would allow devices to extend the operating range in this window which is highly desirable.

An objective of the present disclosure is to explore the advantages of Pr doped nanoclusters in silica fiber so that the technology developed for silica fiber can be employed for this application.

One embodiment of the present invention provides an optical material including: a silica host; and a Praseodymium dopant; wherein the Praseodymium atoms are configured to form Si rich nanoclusters in the silica host.

One embodiment of the present invention provides a fiber amplifier including a fiber made of an optical material that includes: a silica host; and a Praseodymium dopant; wherein the Praseodymium atoms are configured to form Si rich nanoclusters in the silica host.

In addition, the optical material may include an Ytterbium co-dopant. The nanoclusters may include or made completely of Ge, Te, Ta, Lu and/or F, Cl with Pr to minimize multi-phonon quenching. Moreover, the nanoclusters may be encapsulated in a low phonon energy shell to minimize energy transfer to the host matrix.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention.

An embodiment of the present invention proposes doping Praseodymium nanoclusters into silica preforms with the intent of drawing low loss fiber suitable for fabricating amplifiers at 1.3 µm. The nanoclusters would be designed to minimize the effects of quenching from clustering and multi-phonon effects. The advantages of this technique are low loss fiber in the region of interest, cost and potentially a shift in the ESA spectrum to longer wavelengths.

An embodiment of the present invention makes use of highly efficient Pr doped nanoclusters in silica fiber to achieve superior performance relative to fluoride fiber. A preferred embodiment includes co-doping with Yb to achieve optimum performance. In an embodiment of the present invention, the nanoclusters contain but not limited to heavy metals such as Germanium (Ge), Tellurium (Te), Tantalum (Ta), Lutetium (Lu), etc. and/or anions such as Florine (F—) and/or Chlorine (Cl—) to minimize the multi-phonon quenching.

It may also be advantageous to encapsulate the Pr doped nanocluster in a low phonon energy shell to minimize energy transfer to the host matrix. In an embodiment, the nanoclusters are encapsulated by depleting the Praseodymium from the surface of the nanoclusters. In another embodiment, the nanoclusters are encapsulated by coating the nanoclusters by an un-doped or optimized composition that isolates the active ions from the host matrix.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An optical material comprising:
   a silica host; and
   a Praseodymium dopant;
   wherein the Praseodymium atoms are configured to form nanoclusters in the silica host;
   wherein the nanoclusters are configured to have excited state absorption (ESA) which allows gain in the 1.3 micron wavelength region; and
   wherein the nanoclusters are encapsulated in a low phonon energy shell to minimize energy transfer to the host matrix.

2. The optical material of claim 1, further comprising an Ytterbium co-dopant.

3. The optical material of claim 1, wherein the nanoclusters further comprise at least one of the following metals; Ge, Te, Ta, Lu to minimize multi-phonon quenching.

4. The optical material of claim 1, wherein the nanoclusters further comprise at least one of the following anions: F—, Cl— to minimize multi-phonon quenching.

5. The optical material of claim 1, wherein the nanoclusters are configured to have excited state absorption (ESA) which allows the gain spectrum to extend to longer wavelengths in the 1.3 micron region.

6. The optical material of claim 1, wherein the nanoclusters are encapsulated by depleting the Praseodymium from the surface of the nanoclusters.

7. The optical material of claim 1, wherein the nanoclusters are encapsulated by coating the nanoclusters by an un-doped composition that isolates the active ions from the host matrix.

8. A fiber amplifier comprising fiber amplifier including a fiber made of an optical material that comprises:
   a silica host; and
   a Praseodymium dopant;
   wherein the Praseodymium atoms are configured to form nanoclusters in the silica host;
   wherein the nanoclusters are configured to have excited state absorption (ESA) which allows gain in the 1.3 micron wavelength region; and
   wherein the nanoclusters are encapsulated in a low phonon energy shell to minimize energy transfer to the host matrix.

9. The fiber amplifier of claim 8, wherein the optical material further comprises an Ytterbium co-dopant.

10. The fiber amplifier of claim 8, wherein the nanoclusters further comprise at least one of the following metals: Ge, Te, Ta, Lu to minimize multi-phonon quenching.

11. The fiber amplifier of claim 8, wherein the nanoclusters further comprise at least one of the following anions: F—, Cl— to minimize mufti-phonon quenching.

12. The fiber amplifier of claim 8, wherein the nanoclusters are configured to have excited state absorption (ESA) which allows the gain spectrum to extend to longer wavelengths in the 1.3 micron region.

13. The fiber amplifier of claim 8, wherein the nanoclusters are encapsulated by depleting the Praseodymium from the surface of the nanoclusters.

14. The fiber amplifier of claim 8, wherein the nanoclusters are encapsulated by coating the nanoclusters by an un-doped composition that isolates the active ions from the host matrix.

* * * * *